(12) United States Patent
Konchan et al.

(10) Patent No.: US 9,428,097 B2
(45) Date of Patent: Aug. 30, 2016

(54) LATCHING/LOCKING SYSTEM FOR TRUCK HOIST MOUNTED CARGO PODS

(71) Applicant: GM Global Technology Operations LLC, Detroit, MI (US)

(72) Inventors: Jeffrey L. Konchan, Romeo, MI (US); Ian S. Buckley, Swartz Creek, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 202 days.

(21) Appl. No.: 14/191,607

(22) Filed: Feb. 27, 2014

(65) Prior Publication Data

US 2015/0239389 A1    Aug. 27, 2015

(51) Int. Cl.
| B60P 1/02 | (2006.01) |
| B60P 7/13 | (2006.01) |
| B60P 1/64 | (2006.01) |
| B60P 1/44 | (2006.01) |
| B62B 3/00 | (2006.01) |

(52) U.S. Cl.
CPC .. *B60P 7/13* (2013.01); *B60P 1/02* (2013.01); *B60P 1/022* (2013.01); *B60P 1/4457* (2013.01); *B60P 1/6436* (2013.01); *B62B 3/003* (2013.01)

(58) Field of Classification Search
CPC ..... B60P 1/022; B60P 1/4414; B60P 1/4421; B60P 1/4457; B60P 1/6436; B60P 1/6481; B60P 1/649
See application file for complete search history.

(56) References Cited

U.S. PATENT DOCUMENTS

| 2,950,126 | A | * | 8/1960 | Armentrout | B60P 3/073 410/66 |
| 3,168,959 | A | * | 2/1965 | Chandler | B60P 1/43 220/23.4 |
| 3,559,831 | A | * | 2/1971 | Weston | B60P 1/4421 198/793 |
| 3,749,268 | A | * | 7/1973 | Macomber | B60P 1/6427 198/804 |
| 4,093,089 | A | * | 6/1978 | Bohman | B60P 1/36 198/733 |
| 6,655,892 | B2 | * | 12/2003 | Strohfus | B60P 3/055 414/334 |
| 7,025,548 | B2 | * | 4/2006 | Krawczyk | B60P 3/055 410/66 |
| 8,177,471 | B2 | * | 5/2012 | Nespor | B60P 1/02 414/544 |
| 9,127,872 | B1 | * | 9/2015 | Chainey | F25D 11/003 |
| 9,248,771 | B2 | * | 2/2016 | Wisniewski | B60P 1/00 |
| 2009/0252568 | A1 | * | 10/2009 | Morin | B61D 45/007 410/69 |
| 2010/0215468 | A1 | * | 8/2010 | Kollewe | B60P 1/4442 414/544 |
| 2014/0219754 | A1 | * | 8/2014 | Timonen | B60P 1/6436 414/502 |
| 2015/0246631 | A1 | * | 9/2015 | Konchan | B60P 1/022 414/497 |

* cited by examiner

*Primary Examiner* — James Keenan
(74) *Attorney, Agent, or Firm* — BrooksGroup (57) ABSTRACT

One variation may include a cargo truck which may include one or more cargo latching/locking systems integrated into a body portion of the cargo truck which comprise at least one hoist plate which latches and locks at least one cargo pod to the hoist plate and which may be operatively connected to a hoist system which may raise and lower a hoist platform which may be attached to the hoist plate and a method for doing the same.

4 Claims, 7 Drawing Sheets

LATCHING/LOCKING SYSTEM FOR TRUCK HOIST MOUNTED CARGO PODS

TECHNICAL FIELD

The field to which the disclosure generally relates to includes cargo trucks.

BACKGROUND

A cargo truck may transport cargo.

SUMMARY OF ILLUSTRATIVE VARIATIONS

One variation may include a product comprising: a cargo pod latching/locking system comprising: at least one hoist plate; wherein the at least one hoist plate includes at least one horizontal slot across its length which is constructed and arranged to mate with at least one peg on a cargo pod; wherein at least one first latch and at least one second latch are spaced a distance inside the horizontal slot and are moveably attached vertically inside of the at least one slot and wherein at least one latching/locking system is operatively connected to at least one lift system.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

In any number of variations, a cargo truck may be used to transport any of a number of variations of cargo pods. In any of a number of variations, a cargo pod delivery or pick-up area for any of a number of cargo trucks may be limited in space and may require accelerated loading and/or unloading of the cargo pods.

Figure 1:
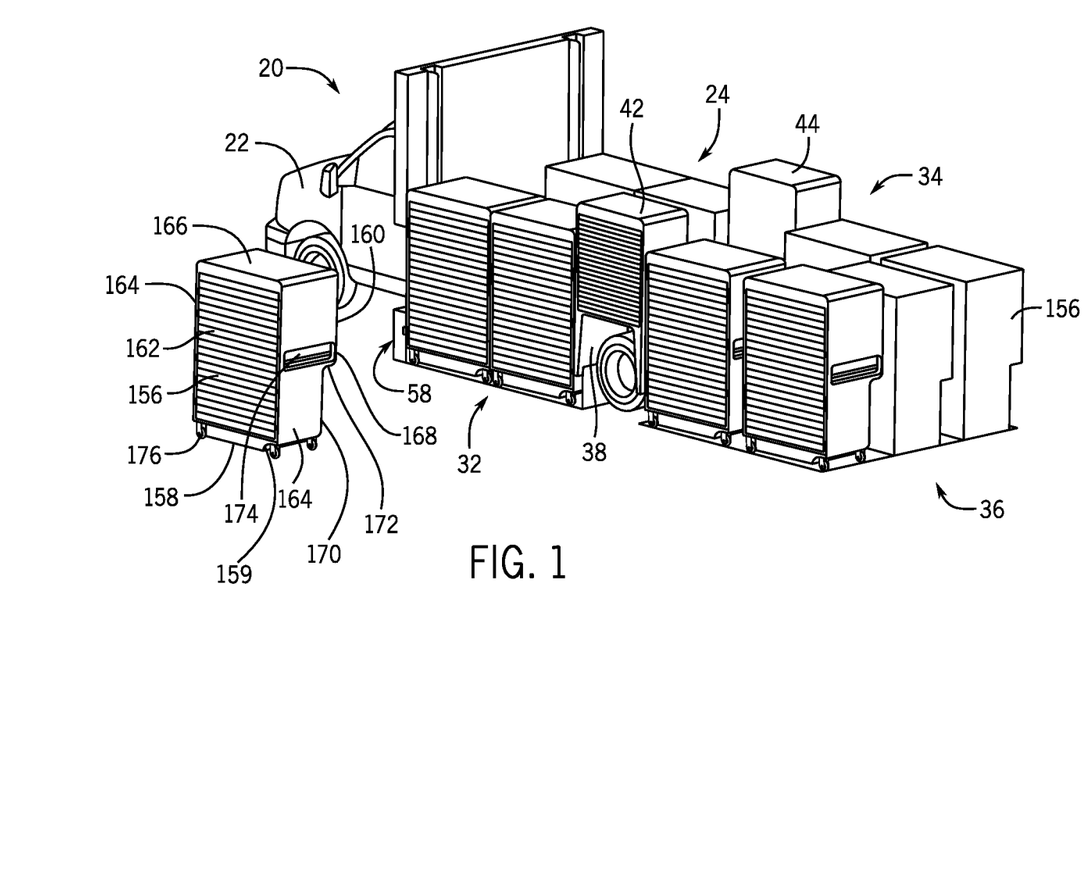
FIG. 1 illustrates a perspective view of a cargo truck including a cargo pod latching/locking lift system including cargo pods according to a number of variations.
Figure 2:
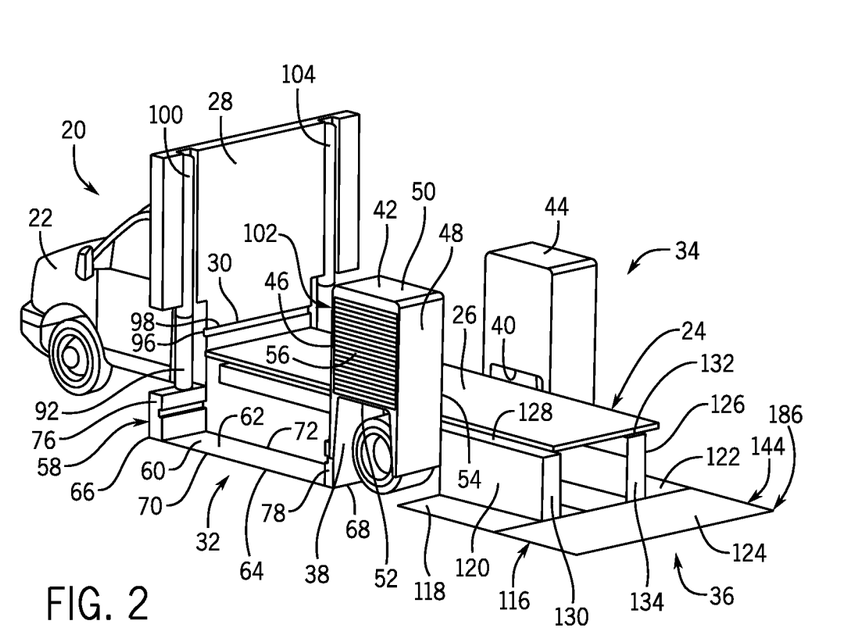
FIG. 2 illustrates a perspective view of a cargo truck including a cargo pod latching/locking lift system according to a number of variations.

Referring to FIGS. 1-2, in any of a number of variations, a cargo truck 20 may include a cab portion 22 and a body portion 24. In any of a number of variations, the body portion 24 may include one or more cargo pod latching/locking lift systems 58 located adjacent the driver's side 32, passenger's side 34, and rear 36 perimeter of the center aisle 26 of the cargo truck 20, which may increase the speed and efficiency of loading and/or unloading one or more cargo pods 156 and which may lock the cargo pods 156 to the cargo pod latching/locking lift system 58. The cargo pod latching/locking lift system 58 may provide additional retention and security to the cargo pods 156 during loading, unloading, and transport of the cargo pods 156 which may prevent the cargo pods 156 from moving freely around the cargo truck 20 and/or inadvertently detaching from the cargo truck 20. The cargo pod latching/locking lift system 58 may also lock the cargo pods 156 in place which may prevent theft.

In any of a number of variations, a cargo truck body 24 may also include a driver's side and a passenger's side storage box 42, 44 which may be located above the driver's side wheelhouse 38 and the passenger's side wheelhouse 40 respectively. The side storage boxes 42, 44 may include a first side wall 46, a second side wall 48, a top surface 50, a bottom surface 52, a front wall 54, and a rear wall 56, for example as illustrated in FIG. 2. The side storage boxes 42, 44 may be used to store various sized cargo. The side storage boxes 42, 44 may be accessed from the exterior of the cargo truck 20 through the rear wall 56 or from the truck center aisle 26 from the front wall 54. The side storage boxes 42, 44 may be fixed to the chassis of the cargo truck 20.

In any of a number of variations, a first cargo pod latching/locking lift system 58 may be located adjacent the center aisle 26 and forward of the driver's side wheelhouse 38. The first cargo pod latching/locking lift system 58 may include a first hoist platform 60 which may comprise a top surface 62, a bottom surface 64, a first side edge 66, a second side edge 68, a front edge 70, and a rear edge 72. In any of a number of variations, the first hoist platform 60 may also include a ramp 74 (best illustrated in FIG. 6), which may assist in the loading and unloading of the cargo pods 156. In any of a number of variations, a first and a second hoist plate 76, 78 may be attached to the first hoist platform 60.

Figure 3:
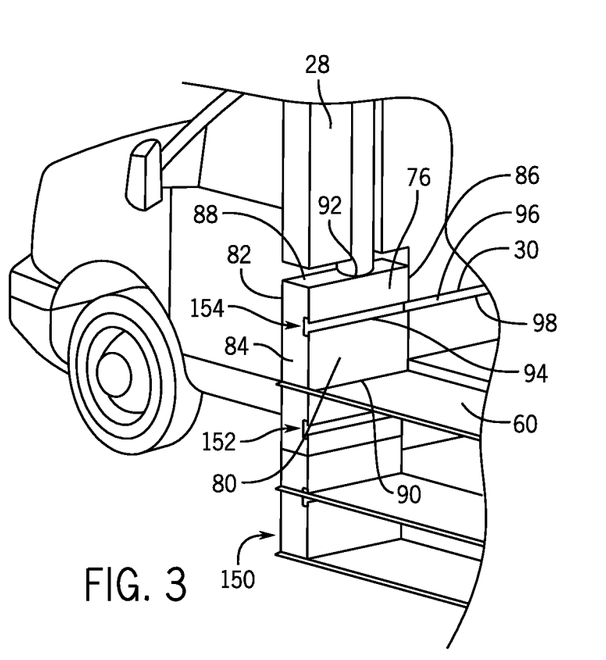
FIG. 3 illustrates a close-up view of a cargo truck cargo pod latching/locking lift system according to a number of variations.
Figure 4:
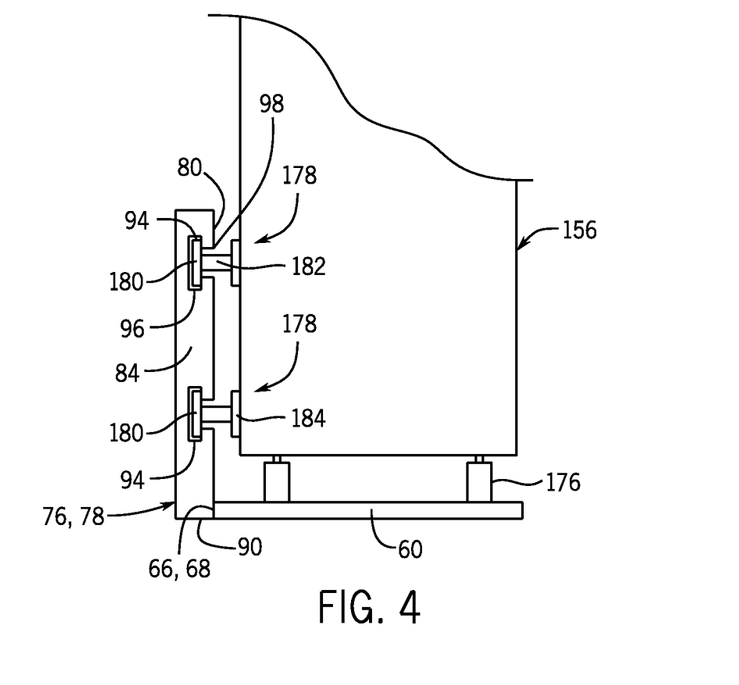
FIG. 4 illustrates a side view of a cargo pod attached to a cargo pod latching/locking lift system according to a number of variations.
Figure 5:
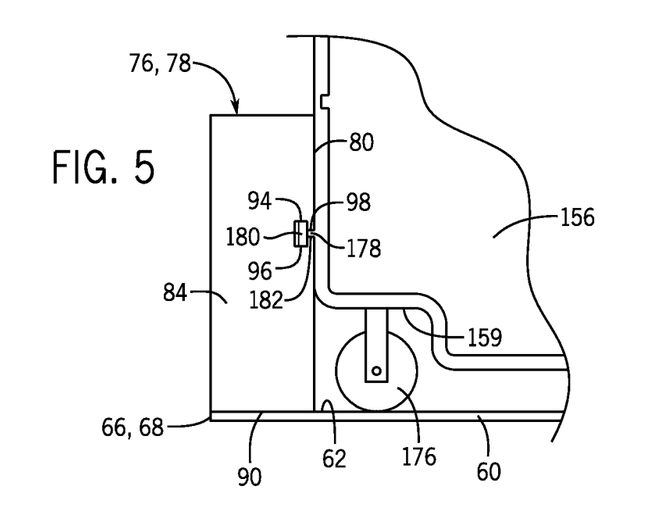
FIG. 5 illustrates a side view of a cargo pod attached to a cargo pod latching/locking lift system according to a number of variations.

Referring to FIGS. 3-5, in any of a number of variations, a hoist plate 76, 78 may include a front face 80, a rear face 82, a first side wall 84, a second side wall 86, a top surface 88, and a bottom surface 90, for example as illustrated in FIG. 3. In one variation, a through-hole 92 may extend through the top surface 88 of the hoist plate 76, 78 through to the bottom surface 90 of the hoist plate 76, 78 and may be constructed and arranged to accept a hydraulic cylinder which will be discussed hereafter. One or more horizontal slots or cutouts 94 may extend through the first side wall 84 and the second side wall 86 adjacent the front face 80. Each horizontal slot 94 may be constructed and arranged to accept a striker or peg 178 which may be attached to a cargo pod 156, for example as illustrated in FIGS. 4-5. The one or more horizontal slots 94 may include a first cutout portion 96 and a second cutout portion 98. The first cutout portion 96 may be constructed and arranged to accept the head 180 of a striker or peg 178 as will be discussed hereafter. The second cut portion 98 may be constructed and arranged to accept the body 182 of the striker or peg 178. In one variation, a hoist plate 76, 78 may include two parallel horizontal cutouts 94, for example as illustrated in FIG. 4. In another variation, a single horizontal cutout 94 may extend across the length of the hoist plates 76, 78, for example as illustrated in FIG. 5.

A first and a second hoist plate 76, 78 may be attached to the first hoist platform 60 in any of a number of variations. In one variation, the bottom surface 90 of the first hoist plate 76 may be attached to the top surface 62 of the first hoist platform 60 adjacent the first side edge 66 of the first hoist platform 60, for example as illustrated in FIG. 5, and the bottom surface 90 of the second hoist plate 78 may be attached to the top surface 62 of the first hoist platform 60 adjacent the second side edge 68 of the first hoist platform 60. In another variation, the front face 80 of the hoist plates 76, 78 adjacent the bottom face 90 of the first and second hoist plates 76, 78 may be attached to the first and second edges 66, 68 of the first hoist platform 60 respectively, for example as illustrated in FIG. 4.

Figure 11:
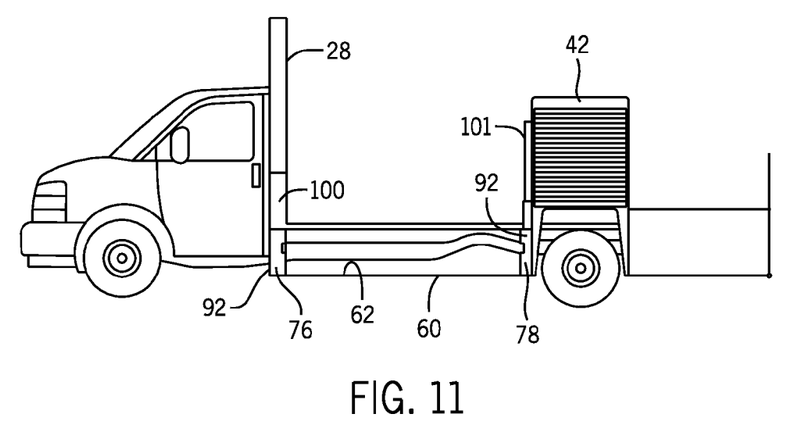
FIG. 11 illustrates a side view of a cargo truck according to a number of variations.

Referring to FIGS. 2 and 11, in any of a number of variations, the first hoist platform 60 may be operatively connected to any of a number of hoist systems including, but not limited to, one or more hydraulic type hoist systems. In one variation, the first hoist platform 60 may be operatively connected to a first hydraulic cylinder 100 which may be integrated into the fixed bulkhead 28 and may extend through the through-hole 92 in the first hoist plate 76, as illustrated in FIG. 2, and may attach to the top surface 62 of the first hoist platform 60. A second hydraulic cylinder 101 may be integrated into the driver's side storage box 42 and may extend through the through-hole 92 in the second hoist plate 78 and may be attached to the top surface 62 of the first hoist platform 60, for example as illustrated in FIG. 11.

In any of a number of variations, a second cargo pod latching/locking lift system 102 may be located adjacent the center aisle 26 and forward of the passenger's side wheelhouse 40. The second cargo pod latching/locking lift system 102 may be the mirror image of the first cargo pod latching/locking lift system 58 and may be operatively connected to a third hydraulic cylinder 104 which may be integrated into the fixed bulkhead 28 and a fourth hydraulic cylinder (not illustrated) which may be integrated into the passenger's side wheelhouse 44.

Referring to FIGS. 2-3, in any of a number of variations, the fixed bulkhead 28 may also include a horizontal slot 30 which may extend the length of the fixed bulkhead 28 and which may be positioned so that the hoist plate cutout 94 is in line with the bulkhead horizontal slot 30 when the first hoist plate 76 is in a full position, as will be discussed hereafter. The fixed bulkhead horizontal slot 30 may also include a first cutout portion 96 which may be constructed and arranged to accept the head 180 of a striker or a peg 178 and a second cutout portion 98 which may be constructed and arranged to accept the body 182 of the striker or peg 178 as will be discussed hereafter.

Figure 6:
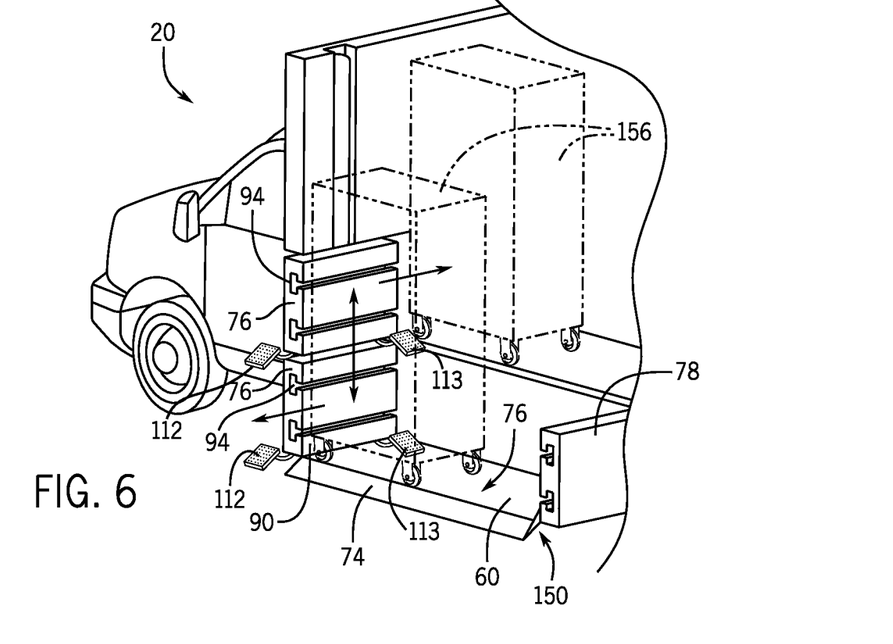
FIG. 6 illustrates a perspective view of a cargo pod latching/locking lift system according to a number of variations.
Figure 8:
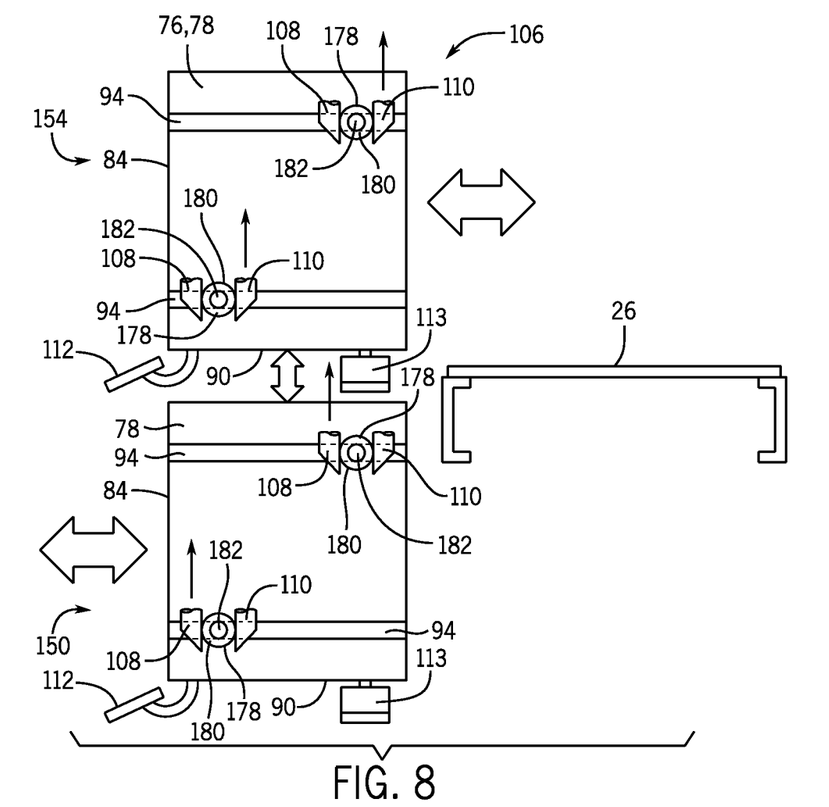
FIG. 8 illustrates a schematic of a locking/latching system according to a number of variations.
Figure 9:
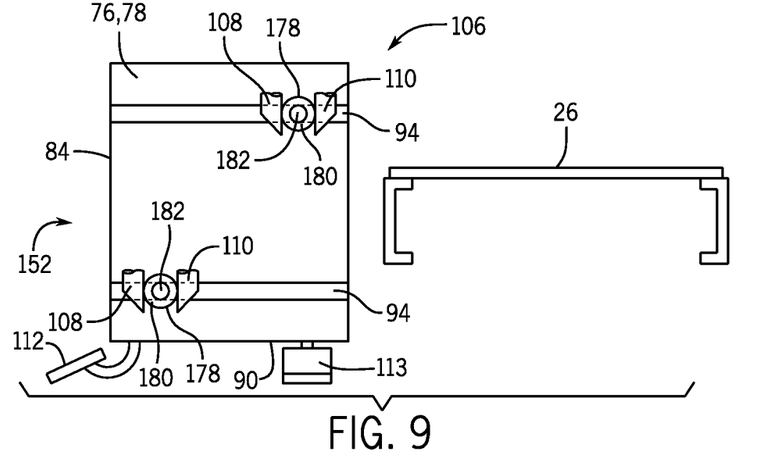
FIG. 9 illustrates a schematic of a locking/latching system according to a number of variations.
Figure 10:
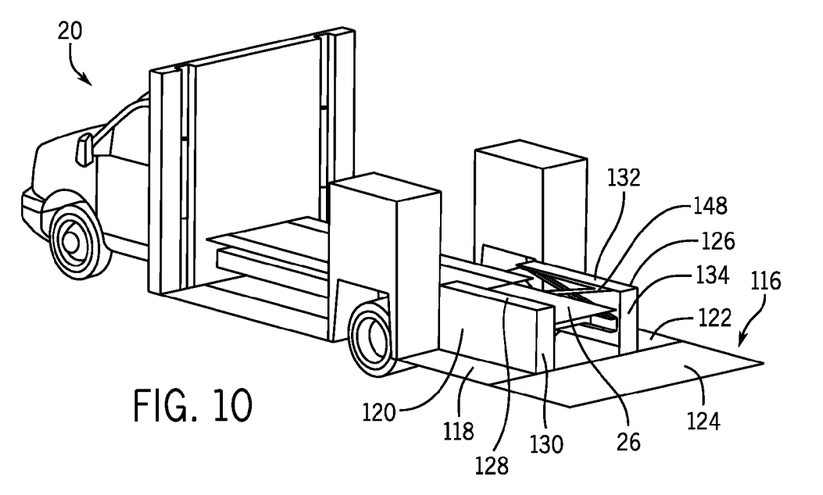
FIG. 10 illustrates a perspective view of a cargo truck including cargo pod latching/locking lift systems according to a number of variations.

Referring to FIGS. 6, 8-9, in any of a number of variations, at least one hoist plate 76, 78 may include a latching/locking system 106. The latching/locking system 106 may include one or more first latches 108 and one or more second latches 110 which may be moveably located inside the one or more horizontal cutouts 94 in at least one of the hoist plates 76, 78, for example as illustrated in FIGS. 8-9. The one or more first latches 108 may be operatively connected to a first pedal 112 which may be constructed and arranged to move the one or more first latches 108 upward. The one or more second latches 110 may be operatively connected to a second pedal 113 which may be constructed and arranged to move the one or more second latches 110 upward. The first pedal 112 may be located in any of a number of locations including, but not limited to, adjacent the bottom surface 90 of the hoist plate 76, 78 and the hoist plate first side wall 84 and may be activated by compressing and/or stepping on the first pedal 112. The second pedal 113 may be located in any of a number of locations including, but not limited to, adjacent the bottom surface 90 of each of the hoist plate 76, 78 and adjacent the hoist plate second side wall 86, for example as illustrated in FIG. 6, and may be activated by compressing and/or stepping on the second pedal 113. The latching/locking system 106 may secure a cargo pod 156 or release a cargo pod 156 from the cargo pod latching/locking lift system 58, 102 as will be discussed hereafter.

Referring to FIG. 2, in any of a number of variations, a third cargo pod lift system 116 may be located rearward of each of the driver's side wheelhouse 38 and the passenger's side wheelhouse 40. The third cargo pod lift system 116 may include a second hoist platform 118, a first back wall 120, a third hoist platform 122, a second back wall 126, and a fourth hoist platform 124. The second, third, and fourth hoist platforms 118, 122, 124 may be any of a number of shapes including, but not limited to, rectangular. In any of a number of variations, the second, third, and fourth hoist platforms 118, 122, 124 may also include a ramp 74 (as illustrated in FIG. 6), which may assist in the loading and unloading of the cargo pods 156. The first and second back walls 120, 126 may be any of a number of shapes including, but not limited to, rectangular. The first back wall 120 may include a first top shelf 128 and a first rear wall 130. The second back wall 126 may include a second top shelf 132 and a second rear wall 134.

Figure 7:
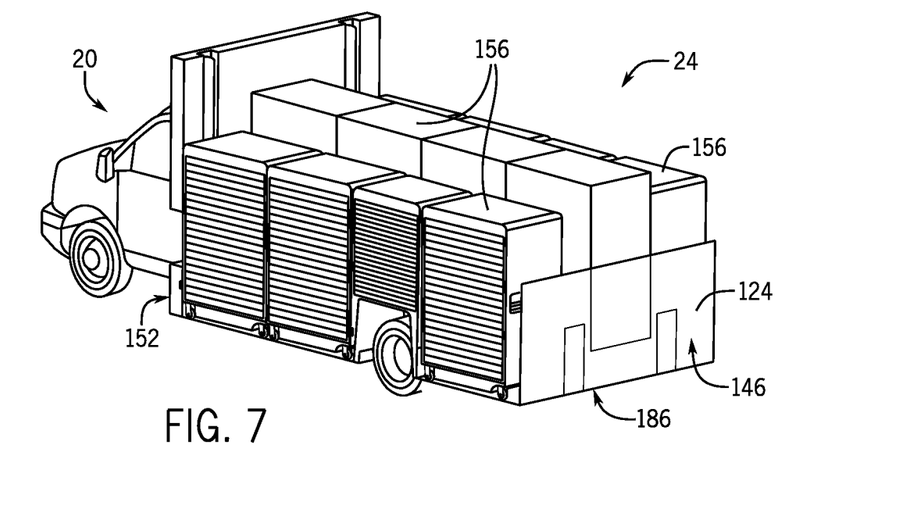
FIG. 7 illustrates a perspective view of a cargo truck cargo pod latching/locking lift system according to a number of variations.
Figure 12:
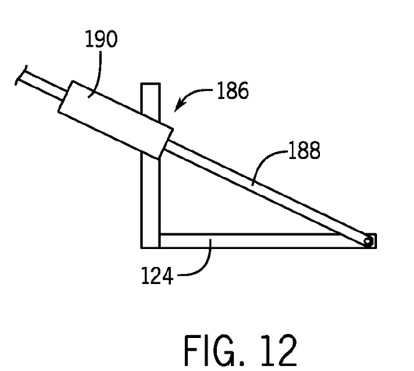
FIG. 12 illustrates a power hinge gate according to a number of variations.

Referring to FIGS. 2, 7, and 12, in any of a number of variations, the fourth hoist platform 124 may comprise a fold down drop-gate 186. In any of a number of variations, the fold down drop-gate 186 may be operatively connected to a powered hinge feature 188 which may be powered in any of a number of variations including, but not limited to, hydraulic cylinders 190, for example as illustrated in FIG. 12, or an electric motor. The fourth hoist platform 124 may be in a down position 144, for example as illustrated in FIG. 2. The fourth hoist platform 124 may also be folded upward 146 which may reduce the overall length of the cargo truck 20 when transportation of additional cargo pods 156 on the fourth hoist platform 124 may not be required, for example as illustrated in FIG. 7. The fourth hoist platform 124 may also provide additional security to any cargo pods 156 which may be inside the cargo truck 20 when in a folded up position 146.

Figure 14:
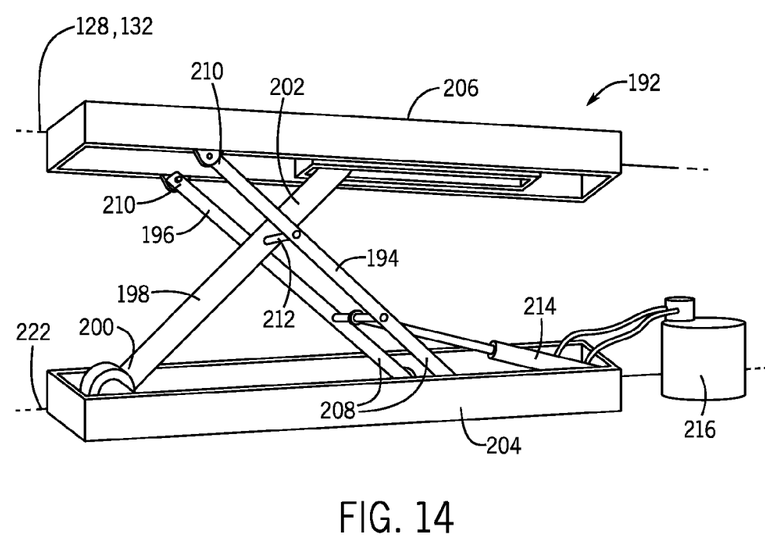
FIG. 14 illustrates a scissor type hoist according to a number of variations.

Referring to FIGS. 2, 6-7, 10, and 14 in any of a number of variations, the third cargo pod lift system 116 may be operatively connected to any of a variety of hoist systems including, but not limited to, one or more scissor type hoists 192, for example as illustrated in FIG. 14. In one variation, a first scissor hoist (not illustrated) may be operatively connected to the underside of the first top shelf 128 on the first back wall 120 and a second scissor hoist 148 may be operatively connected to the underside of the second top shelf 132 on the second back wall 126. A scissor type hoist 192 may include a first member 194, second member 196, and third member 198, for example as illustrated in FIG. 14. The first member 194 and the second member 196 may lay parallel with each other and may lie at an angle opposite of the third member 198. A pin 212 may extend through each of the first, second, and third members 194, 196, 198. The third member 198 may include a first end 200 and a second end 202. The first end 200 of the third member 198 may be rotatably fixed to a bottom plate 204. The second end 202 of the third member 198 may be slidably attached to an upper plate 206. The first and second members 194, 196 may each include a first end 208 and a second end 210. The first ends 208 of the first and second members 194, 196 may be slidably attached to the bottom plate 204. The second ends 210 of the first and second members 194, 196 may be rotatable attached to the upper plate 206. An upper plate 206 may be attached to the underside of the top shelf 128, 132 and a bottom plate 204 may be attached to the truck frame 222. The first and second members 194, 196 may be actuated by any of a number of sources including, but not limited to, a hydraulic cylinder 214, mechanics, and/or pneumatics, which may be activated by any number of power sources 216 to mechanically raise or lower the upper plate 206. Both the first scissor lift and the second scissor lift 148 may be operatively connected to the same power source 216 or independent power sources. The first and the second scissor lifts 148 may work together to raise the third cargo pod lift system 116.

In any of a number of variations, the first cargo pod lift system 58, the second cargo pod lift system 102, and the third cargo pod lift system 116 may be controlled simultaneously so that each cargo pod lift system 58, 102, 116 may be raised or lowered at the same time. In another variation, each cargo pod lift system 58, 102, 116 may be controlled independently so that each cargo pod lift system 58, 102, 116 may be raised or lowered at various intervals.

Figure 13:
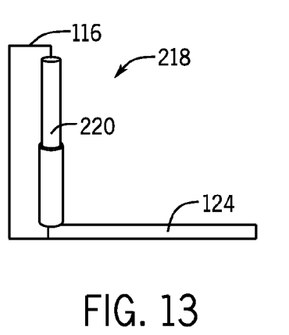
FIG. 13 illustrates a vertical lift according to a number of variations.

Referring to FIG. 13, in a number of variations, the fourth hoist platform 124 may include its own vertical lift system 218, which may include any of a number of vertical hoist systems including, but not limited to, a vertical hydraulic lift 220. In any of a number of variations, the vertical hydraulic lift 220 may be operatively connected to the third cargo pod lift system 116. In this variation, the fourth hoist platform 124 may be lifted or lowered independently from the third cargo pod lift system 116.

Referring to FIG. 3, in any of a number of variations, the first, second, and third cargo pod lift systems 58, 102, 116 may be lifted or lowered to various positions including, but not limited to, a down position 150, a driving position 152, or a full position 154.

Referring to FIGS. 1, and 4-7, in any of a number of variations, one or more cargo pods 156 may be loaded into the cargo truck 20. In any of a number of variations, a cargo pod 156 may comprise a bottom surface 158, a front wall 160, a rear wall 162, two opposing side walls 164, and a lid 166, for example as illustrated in FIG. 1. The front wall 160 may include a first surface 168, a second surface 170, and a lip 172 extending therebetween. The rear wall 162 may be substantially planar. The opposing side walls 164 may each include a handle feature 174 which may be constructed and arranged so that an operator may lift and/or move the cargo pod 156, which may assist in the loading and unloading of the cargo pods 156. The handle feature 174 may include, but is not limited to, an indentation which may be constructed and arranged to accommodate a hand or a lifting device. The cargo pod 156 may also include a plurality of wheels 176 which may be attached to the bottom surface 158 of the cargo pod 156 which may include an indentation 159 which may be constructed and arranged to accommodate the plurality of wheels 176, for example as illustrated in FIG. 5. The plurality of wheels 176 may be stationary or rotatable. A lid 166 may be used to enclose cargo inside the cargo pod 156. In one variation, the lid 166 may be attached to the cargo pod 156 by a hinge feature (not illustrated) which may allow it to be opened or closed. In another variation, the lid 166 may be a separate component which may be constructed and arranged to mate with the rim of the cargo pod 156.

At least one of the opposing side walls 164 may also include one or more strikers or pegs 178 which may be constructed and arranged to mate with a horizontal slot 94 on a hoist plate 76, 78 and a fixed bulkhead slot 30, for example as illustrated in FIGS. 4-5. In one variation, two or more pegs 178 may be spaced apart and offset from each other, for example as illustrated in FIGS. 8-9, which may provide additional stability and/or security to the cargo pod 156 during loading, unloading, and/or transportation of the cargo pod 156. In one variation, the peg 178 may include a head 180, a body 182, and an optional base 184, for example as illustrated in FIG. 4. The head 180 may be any of a number of configurations including, but not limited to, a circular or square shape. The body 182 may be any of a number of configurations including, but not limited to, a cylindrical shape. The base 184 of the peg 178 may be any of a number of configurations including, but not limited to, a circular or square shape. In another variation, the peg 178 may not include a base, for example as illustrated in FIG. 5. The one or more pegs 178 may be incorporated into the cargo pod 156, or they may be separate components.

Referring to FIGS. 2, 3, 6, and 8, in any of a number of variations, when any of the hoist plates 76, 78 are in a down position 150, a cargo pod 156 may be pushed onto the hoist platform 60, 118, 122, 124 so that at least one peg 178 may slide into a horizontal slot 94 on the hoist plate 76, 78. The first latch 108 may be constructed and arranged so that when the at least one peg 178 is pushed against it, it may drive the latch 108 upward so that the peg 178 may pass through and then may spring back downward which may lock the cargo pod peg 178 to the hoist plate 76, 78. The second pedal 113 may be mechanically blocked out when the hoist plate 76, 78 is in a down position 150.

Referring to FIG. 9, in any of a number of variations, the hoist plate, 76, 78 may be raised to a mid-position or driving position 152. In the driving position 152, both the first pedal 112 and the second pedal 113 may be mechanically blocked so that both the at least one first latch 108 and the at least one second latch 110 may not be moved. This may prevent inadvertent detachment of the cargo pod 156 during transit and may also prevent theft.

Referring to FIGS. 3 and 6-8, in any of a number of variations, the hoist plate 76, 78 may be raised to a full position 154. In the full position 154, the first pedal 112 may be mechanically blocked out which may prevent inadvertent detachment of a cargo pod 156 from the cargo truck 20 from an elevated height which may prevent damage to the cargo and/or injury to an operator. The at least one second latch 110 may be moved upward by activating the second pedal 113 so that the cargo pod 156 may be released into the center aisle 26 of the cargo truck 20, which may allow for the storage of additional cargo pods 156, for example as illustrated in FIG. 7. The one or more pegs 178 on the cargo pod 156 may then slide into the fixed bulkhead cutout 30, for example as illustrated in FIG. 3, which may provide further security to the cargo pod 156 which may prevent the cargo pod 156 from moving freely around the center aisle 26 of the cargo truck 20.

In any of a number of variations, the hoist plates 76, 78 may be lowered back down to a down position 150. The first pedal 112 may be activated so that the one or more first latches 108 may move upward which may release the cargo pod 156 from the cargo truck 20, for example as illustrated in FIGS. 6 and 8. The at least one second latch 110 may be mechanically blocked out so that the at least one second latch 110 may be locked into place while the hoist platform 60, 118, 122 is in the down position 150.

In any of a number of variations, the first pedal 112 and the second pedal 113 may be comprised of any of a number of pedal systems including, but not limited to, spring loaded pedals which may include a linkage rod or cable which may be routed from the pedal 112, 113 which may move the latches 108, 110 upward. The latches 108, 110 may be mechanically blocked out in any of a number of variations including, but not limited to, linkages, electric actuators and position sensor switches, or cables moving blocking pins.

The use of the first pedal 112 and the second pedal 113 may allow for quicker and easier loading and unloading of cargo pods 156 as the cargo pods 156 may be released from the cargo truck 20 without a key which may provide the operator with more control as the operator may release the cargo pods 156 out of the cargo truck 20 or into the center aisle 26 by stepping on the first pedal 112 or second pedal 113 while keeping the operator's hands free to hold onto the cargo pod 156.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a product comprising: a cargo pod latching/locking system comprising: at least one hoist plate; wherein the at least one hoist plate includes at least one horizontal slot across its length which is constructed and arranged to mate with at least one peg on a cargo pod; wherein at least one first latch and at least one second latch are spaced a distance inside the horizontal slot and are moveably attached vertically inside of the at least one slot.

Variation 2 may include a product as set forth in Variation 1 further comprising a first pedal and a second pedal; wherein the first pedal is operatively connected to the at least one first latch and is constructed and arranged to move the at least one first latch; and wherein the second pedal is operatively connected to the at least one second latch and is constructed and arranged to move the at least one second latch.

Variation 3 may include a product as set forth in any of Variations 1-2 wherein the at least one hoist plate is operatively connected to at least one cargo pod hoist lift systems which is constructed and arranged to lift and lower one or more cargo pods.

Variation 4 may include a product as set forth in any of Variations 1-3 wherein the at least one cargo pod hoist lift system lifts and lowers the hoist plate to any of a full position, a driving position, or a down position.

Variation 5 may include a product as set forth in any of Variations 1-4 wherein when the cargo pod hoist lift system is in a down position, the first pedal can be activated to move the at least one first latch into the hoist plate and out of the horizontal slot and wherein the second pedal is mechanically blocked out.

Variation 6 may include a product as set forth in any of Variations 1-5 wherein when the cargo pod hoist system is in a driving position both the first pedal and the second pedal are mechanically blocked out.

Variation 7 may include a product as set forth in any of Variations 1-6 wherein when the cargo pod hoist system is in a full position, the second pedal can be activated to move the at least one second latch into the hoist plate and out of the horizontal slot and wherein the first pedal is mechanically blocked out.

Variation 8 may include a product as set forth in any of Variations 1-7 wherein the first pedal and the second pedal are spring loaded and which each include a linkage rod or cable which is routed from the first and second pedal respectively to move the at least one first latch and the at least one second latch upward.

Variation 9 may include a product as set forth in any of Variations 1-8 wherein the first pedal and the second pedal are mechanically blocked out by linkages.

Variation 10 may include a product as set forth in any of Variations 1-8 wherein the first pedal and the second pedal are mechanically blocked out by cables moving one or more blocking pins.

Variation 11 may include a product as set forth in any of Variations 1-8 wherein the first pedal and the second pedal are mechanically blocked out by at least one electric actuator and at least one position sensor switch.

Variation 12 may include a product as set forth in any of Variations 1-11 wherein at least one cargo pod hoist lift system comprises a lift platform which is operatively connected to a first and second hoist and wherein the first and second hoist are lifted and lowered by hydraulics.

Variation 13 may include a product as set forth in any of Variations 1-12 wherein the at least one cargo pod hoist lift system comprises a lift platform which is mechanically activated to raise or lower.

Variation 14 may include a product as set forth in any of Variations 1-13 wherein the at least one cargo pod hoist lift system comprises a lift platform which is lifted and lowered by a scissor type hoist.

Variation 15 may include a product as set forth in any of Variations 1-14 wherein the one or more cargo pod hoist lift systems are operatively connected to a cargo truck.

Variation 16 may include a product comprising; a cargo pod comprising: a bottom surface, a front wall, a rear wall, a first side wall, a second side wall, and a lid; wherein the front wall includes a first surface, a second surface, and a lip; wherein at least one peg is attached to at least one of the first or second side walls and wherein the at least one peg is constructed and arranged to attached to a slot on a hoist plate on a cargo pod hoist lift system; wherein the first side wall and the second side wall include a handle feature; and wherein a plurality of wheels are attached to the bottom surface.

Variation 17 may include a method comprising: loading/unloading a cargo truck with one or more cargo pods comprising: providing a cargo truck with one or more cargo pod latching/locking hoist lift systems; wherein at least one of the one or more cargo pod latching/locking hoist lift systems include at least one hoist plate which includes at least one horizontal slot which is constructed and arranged to accommodate at least one peg on a cargo pod and which includes at least one first latch operatively connected to a first pedal and at least one second latch operatively connected to a second pedal; providing at least one cargo pod with at least one peg which is constructed and arranged to mate with the horizontal slot on at least one hoist plate; lowering the at least one cargo pod latching/locking hoist lift system to a down position; attaching the at least one cargo pod to the at least one hoist plate by sliding the at least one peg into the at least one horizontal slot locking the cargo pod peg into place; raising the at least one latching/locking cargo pod hoist lift system and cargo pod to a full position, raising the at least one second latch by activating the second pedal, and loading one or more cargo pods into a center aisle of the cargo truck; lowering the at least one latching/locking cargo pod hoist lift system to a driving position; and lowering the at least one latching/locking cargo pod hoist lift system to a down position, raising the at least one first latch by activating the first pedal to move the at least one first latch upward, and unloading the at least one cargo pod from the cargo truck.

Variation 18 may include a method as set forth in Variation 17 wherein the second pedal is mechanically blocked out when the cargo pod latching/locking hoist lift is in a down position.

Variation 19 may include a method as set forth in any of Variations 17-18 wherein the first pedal and the second pedal are mechanically blocked out when the cargo pod latching/locking hoist lift system is in a driving position.

Variation 20 may include a method as set forth in any of Variations 17-19 wherein the first pedal is mechanically blocked out when the cargo pod latching/locking hoist lift system is in a full position.

Variation 21 may include a product comprising: a cargo pod latching/locking system comprising: at least one hoist plate; wherein the at least one hoist plate includes at least one horizontal slot across its length which is constructed and arranged to mate with at least one peg on a cargo pod; wherein at least one first latch and at least one second latch are spaced a distance inside the horizontal slot and are moveably attached vertically inside of the at least one slot; a first pedal and a second pedal; wherein the first pedal is operatively connected to the at least one first latch and is constructed and arranged to move the at least one first latch; and wherein the second pedal is operatively connected to the at least one second latch and is constructed and arranged to move the at least one second latch; and wherein the at least one hoist plate is attached to at least one platform and is constructed and arranged to accommodate at least one cargo pod; and wherein the at least one platform is operatively connected to a means for raising and lowering the at least one platform and the at least one hoist plate to at least one of a down position, a driving position, or a full position.

Variation 22 may include a product as set forth in Variation 21 wherein the second pedal is mechanically blocked out when the hoist plate is in a down position.

Variation 23 may include a product as set forth in any of Variations 21-22 wherein the first pedal and the second pedal are each mechanically blocked out when the hoist plate is in a driving position.

Variation 24 may include a product as set forth in any of Variations 21-23 wherein the first pedal is mechanically blocked out when the hoist plate is in a full position.

The above description of select examples of the invention is merely illustrative in nature and, thus, variations or variants thereof are not to be regarded as a departure from the spirit and scope of the invention.

What is claimed is:

1. A method comprising:
loading/unloading a cargo truck with one or more cargo pods comprising:
providing a cargo truck with one or more cargo pod latching/locking hoist lift systems;
wherein at least one of the one or more cargo pod latching/locking hoist lift systems include at least one hoist plate which includes at least one horizontal slot which is constructed and arranged to accommodate at least one peg on a cargo pod and which includes at least one first latch operatively connected to a first pedal and at least one second latch operatively connected to a second pedal;
providing at least one cargo pod with at least one peg which is constructed and arranged to mate with the horizontal slot on at least one hoist plate;
lowering the at least one cargo pod latching/locking hoist lift system to a down position;
attaching the at least one cargo pod to the at least one hoist plate by sliding the at least one peg into the at least one horizontal slot thereby locking the cargo pod peg into place;
raising the at least one latching/locking cargo pod hoist lift system and cargo pod to a full position, raising the at least one second latch by activating the second pedal, and loading one or more cargo pods into a center aisle of the cargo truck;
lowering the at least one latching/locking cargo pod hoist lift system to a driving position; and
lowering the at least one latching/locking cargo pod hoist lift system to a down position, raising the at least one first latch by activating the first pedal to move the at least one first latch upward, and unloading the at least one cargo pod from the cargo truck.

2. The method of claim 1 wherein the second pedal is mechanically blocked out when the at least one cargo pod latching/locking hoist lift system is in a down position.

3. The method of claim 1 wherein the first pedal and the second pedal are mechanically blocked out when the at least one cargo pod latching/locking hoist lift system is in a driving position.

4. The method of claim 1 wherein the first pedal is mechanically blocked out when the at least one cargo pod latching/locking hoist lift system is in a full position.

* * * * *